(12) United States Patent
Kronander et al.

(10) Patent No.: US 8,731,591 B2
(45) Date of Patent: May 20, 2014

(54) METHOD AND APPARATUS RELATING TO SECONDARY USE OF RADIO RESOURCES

(75) Inventors: Jonas Kronander, Uppsala (SE); Peter Larsson, Solna (SE); Yngve Selén, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 13/141,851

(22) PCT Filed: Dec. 23, 2008

(86) PCT No.: PCT/SE2008/051560
§ 371 (c)(1),
(2), (4) Date: Jun. 23, 2011

(87) PCT Pub. No.: WO2010/074622
PCT Pub. Date: Jul. 1, 2010

(65) Prior Publication Data
US 2011/0263285 A1    Oct. 27, 2011

(51) Int. Cl.
*H04B 7/00* (2006.01)
*H04W 72/00* (2009.01)
*H04M 1/00* (2006.01)

(52) U.S. Cl.
USPC .......................... 455/509; 455/450; 455/513

(58) Field of Classification Search
USPC ............................ 455/509, 450, 452.1, 452.2
See application file for complete search history.

(56) References Cited

U.S. PATENT DOCUMENTS 6,950,675 B2 * 9/2005 Wilhelm .................... 455/552.1
7,298,713 B2 * 11/2007 Goldberg et al. ............ 370/312
2003/0198200 A1   10/2003 Diener et al.
2006/0172713 A1    8/2006 Suzuki et al.
2008/0095100 A1    4/2008 Cleveland et al.
2010/0008312 A1 *  1/2010 Viswanath .................... 370/329

FOREIGN PATENT DOCUMENTS

| JP | 2005-523616 | 8/2005 |
| JP | 2008-245041 | 10/2008 |
| WO | WO 03/090037 | 10/2003 |
| WO | WO 2005/002101 | 1/2005 |
| WO | WO 2008/039872 | 4/2008 |
| WO | WO 2008/144323 | 11/2008 |

OTHER PUBLICATIONS

International Search Report for PCT/SE2008/051560, mailed Oct. 13, 2009.
Written Opinion for PCT/SE2008/051560, mailed Oct. 13, 2009.
Office Action for JP 2011-542046 (with English Translation), mailed Feb. 12, 2013.

* cited by examiner

*Primary Examiner* — Tilahun B Gesesse
(74) *Attorney, Agent, or Firm* — Nixon & Vanderhye, P.C.

(57) ABSTRACT

According to aspects of the invention, a radio signal that constitutes a secondary use is provided with a predefined identifier (11) that identifies the radio signal as a secondary use. The identifier (11) can be any suitable signal characteristic that somehow can be detected by a suitable radio receiver. The identifier (11) enables identification of an origin of the radio signal. That is, whether it originates from a primary user or a secondary user. It therefore becomes possible to give all secondary users a more equal status, facilitating resource sharing. A transmitter is provided with an identifier inserter (25) for providing the identifier (11) in a transmitted radio signal. In a corresponding manner, a receiver is provided with identifier detector (29) for detecting a presence of the identifier in a received signal.

21 Claims, 8 Drawing Sheets

METHOD AND APPARATUS RELATING TO SECONDARY USE OF RADIO RESOURCES

This application is the U.S. national phase of International Application No. PCT/SE2008/051560 filed 23 Dec. 2008 which designated the U.S., the entire contents of which is hereby incorporated by reference.

The present invention pertains to the field of radio communications, and in particular to the part of this field that is concerned with secondary use of radio resources.

BACKGROUND

Recent research has shown that usage of the radio spectrum is often fairly inefficient. One key factor in this is the current spectrum licensing system. That is, some part of the radio spectrum is licensed to a party, such as an operator of a radio communications system, who is given an exclusive right to use this part of the radio spectrum. For example, even though most of the spectrum relevant for mobile communication, is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of the spectrum are highly underutilized. Therefore, a more flexible use of the radio spectrum has become a research intensive subject within which the aim is at optimizing, i.e. maximizing, the usage of the available radio spectrum.

To address the above-indicated issues, the FCC (Federal Communications Commission) took, in 2005, an initiative to open up for so-called secondary use of the spectrum. That is, radio resources that, e.g. under a license, are owned by one party—the primary party—may also be used by others (secondary users) for purposes (secondary use) that do not fall within the operation (primary use) of the primary party. Consequently, a secondary user may use radio resources owned by the primary party without having a license and without having made an explicit agreement with the primary party. A requirement for accessing radio resources as a secondary user is that the primary party should not be exposed to harmful interference caused by the secondary use. In brief: a secondary user is allowed to transmit over radio resources owned by the primary party if it can be ensured that the primary party is, for all practical purposes, not affected.

Consequently, a primary use of radio resources is a use that takes precedence, normally because the use falls within the activities performed or expressly allowed by the primary party owning the radio resources. A primary user (e.g. the primary party) is a user that engages in a primary use of radio resources. A primary user equipment is a technical equipment capable of engaging in a primary use of radio resources. Correspondingly, a secondary use of radio resources, which have a primary use, is a use that can be allowed provided the use does not interfere with any primary use. A secondary user is a user that engages in a secondary use of radio resources. A secondary user equipment is a technical equipment capable of engaging in a secondary use of radio resources. Notice that a particular piece of user equipment may be a primary user equipment as well as a secondary user equipment (multiple capabilities).

As is well understood by the person skilled in the art, the particular manner in which the radio resources involved here are defined depends of course on the situation under consideration, and in particular on how radio resources are defined for the primary use. In general, however, the radio resources involved are normally defined in terms of at least spectrum and time utilization. Specification of communication codes, e.g. channelization codes, scrambling codes etc. may also be part of defining the radio resources that can be employed for secondary use. Furthermore, geographical limitations may provide further means of definition. As is well understood by a person skilled in the art, radio signals are subject to distance dependent attenuation. That is, the power density of a radio signal decreases rather rapidly with a distance to a source of the radio signal. Hence, sufficiently far from the signal source, the signal power can be neglected and the spectrum used to transmit the radio signal can be used simultaneously for transmitting other radio signals. For example, the same radio channel can be reused in several different locations, provided that the geographical distance between these locations is sufficiently large. Consequently, the same radio channel can be viewed as distinct radio resources in different geographical regions. This is the principle underlying frequency reuse in, for example, cellular communications systems.

As a consequence of the above-mentioned FCC initiative, several standardization activities in the area of dynamic spectrum sharing have been initialized (IEEE 802.22, IEEE SCC41/P1900), and some are about to be started (ETSI activities). Regulators are currently investigating the possibilities of allowing secondary use of the spectrum.

According to one suggested scenario, access of a secondary user is performed based on so-called sensing of radio resources owned by the primary party. Here, sensing is the act of detecting whether the radio resources intended to be utilized in a secondary use are already utilized in a primary use or a secondary use by another secondary user. Only if the radio resources are not utilized in the primary use, is it allowed to utilize the radio resources for the intended secondary use. One way to accomplish this is described in Lifeng Lai, Hesham El Gamal, Hai Jiang and H. Vincent Poor, "Cognitive Medium Access: Exploration, Exploitation and Competition", submitted to IEEE/ACM Trans. on Networking, October, 2007. Here, transmissions relating to both primary and secondary use are performed in a time slotted manner based on a common synchronisation scheme. A first part of each time slot is dedicated for primary use. Secondary users may sense this part, and if a transmission is detected in this part, it can be safely concluded that the transmission relates to a primary use, in which case secondary use is not possible. A last part of the time slot is only accessed for secondary use if no primary use is detected during the first part of the time slot. The secondary users may follow a CSMA/CA (Carrier Sense Multiple Access/Collision Avoidance) scheme to share the resource fairly.

Above, the secondary users need to synchronize their timeslots in order to be able to distinguish between primary and secondary uses. This is a drawback since extra signalling among the secondary systems will be required. Furthermore, one may easily envision situations where a secondary user equipment that is out of synchronization with other user equipments (primary and/or secondary) will be detected as a primary user equipment (e.g. during the first "sensing"-part of the timeslot) and will hence only need to share the radio resources with the primary users. This would result in an unfair sharing of the opportunities for secondary access among the secondary users.

A problem to be solved by the present invention is thus to overcome or at least mitigate at least one of the above-indicated difficulties relating secondary use of radio resources.

SUMMARY

According to one aspect of the present invention, the above-stated problem is solved with a method relating to secondary use of one or more radio resources. Once a decision has been made to engage in a secondary use of radio resources, which also have some predefined primary use, a secondary use radio signal is transmitted using the radio resources. This radio signal is, however, provided with a predefined identifier which identifies the radio signal, to potential receivers, as a secondary use of the radio resources. According to the invention, the above-stated problem is also solved with a transmitter which comprises means for proving a transmitted signal with such a predefined identifier.

According to another aspect of the present invention, the above-stated problem is solved with another method relating to secondary use of one or more radio resources. Sensing of the radio resources is first performed in order to determine whether any radio signal is currently transmitted using the sensed radio resources. If the sensing operation reveals that a radio signal is transmitted, a detection is made in order to determine whether a predefined identifier is present in the radio transmission. The predefined identifier is here an identifier that identifies the transmission as a secondary use of the radio resources. According to the invention, the above stated problem is also solved with a receiver which comprises means for detecting the predefined identifier in a received radio signal.

According to yet another aspect of the present invention, the above-stated problem is solved with a secondary user equipment. The secondary user equipment comprises at least one transceiver having a transmitter which is capable of introducing the predefined identifier in a transmitted radio signal and a receiver capable of detecting a presence of the predefined identifier in a received signal. The secondary user equipment further comprises a radio controller connected to the at least one transceiver and configured to control an operation of the at least one transceiver.

One main advantage of the invention is that the introduction of the above-mentioned identifier makes it possible to distinguish between primary and secondary uses in a very simple and efficient manner. There is no need for complicated signalling and synchronization between primary and secondary users. In fact, the primary party is here completely unaffected by the introduction of secondary use opportunities. Furthermore, the sharing of resources between different secondary users can be more easily made in a fair manner, since there is now little or no chance of a secondary user being mistaken for a primary user. The person skilled in the art will appreciate that further objects and advantages may be associated with particular exemplary embodiments of the invention. Which exemplary embodiments are set out in the detailed description with reference to the drawings.

BRIEF DESCRIPTION OF THE DRAWINGS

FIG. 3b is a diagram illustrating an autocorrelation function associated with the radio signal format of FIG. 3a.

DETAILED DESCRIPTION

Figure 1:
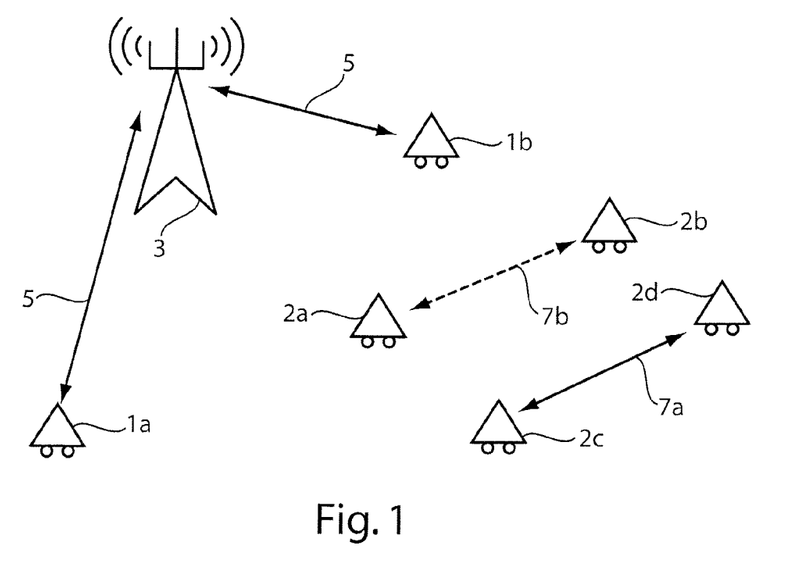
FIG. 1 is a schematic diagram illustrating a communication situation where embodiments to the invention may be applied.

FIG. 1 is a schematic diagram illustrating an exemplary communications situation where the present invention may advantageously be applied. Here, a primary party, e.g. an operator, has a license to a part of the radio spectrum. The primary party provides communications services via a wireless network, here represented by wireless communications station 3. The services may be, for example, TV transmissions or wireless communications services such as mobile (cellular) telephony, or any other radio based services. In the example of FIG. 1, a primary use is a use of the services provided by the primary party. There are currently two primary user equipments 1a and 1b, which are engaged in radio communications that constitute a primary use 5 of radio resources owned by the primary party. There are currently also four secondary user equipments 2a-2d. The secondary user equipments 2c and 2d are, by way of example, engaged in radio communication, which here constitute a secondary use 7a of radio resources owned by the primary party. This can be allowed if the radio resources in question are not currently engaged in a primary use, e.g. a currently free radio channel is used. In the example of FIG. 1, a secondary user (not shown) operating the secondary user equipment 2a is contemplating communications with the secondary user equipment 2b through a secondary use of radio resources owned by the primary party. This intended secondary use is shown as a dashed line 7b in the figure. Before engaging in the secondary use, the user equipment 2a senses the radio resources intended to be used. If the sensing reveals that the radio resources are already in use, the user equipment 2a must refrain from the secondary use. However, this can occur in two rather distinct situations. In the first situation, the sensed radio resources are involved in a primary use. In the second situation, the sensed radio resources are involved in a secondary use, e.g. the communication 7a. Conventionally, the secondary user equipment 2a will, however, have to treat both situations in the same manner. That is, the secondary user equipment 2a will give a secondary use the same precedence as a primary use. The secondary user equipment 2a will therefore, in practice, not have an equal right to the secondary use of the radio resources, when compared to secondary user equipments already engaged in communication over the said resources. This asymmetric situation is, however, usually undesirable, and embodiments of the invention will show how this situation can mitigated in a simple and effective manner.

Figure 14:
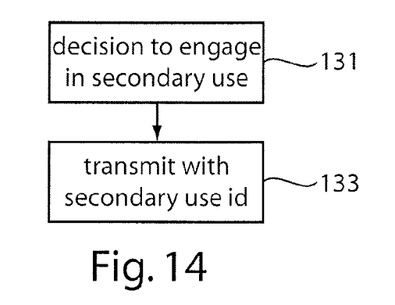
FIG. 14 is a flow chart illustrating a method relating to secondary use communications according to an embodiment of the invention.

According to some embodiments of the invention, it is suggested that any radio signal that constitutes a secondary use be provided with a predefined identifier that identifies the radio signal as a secondary use. An exemplary embodiment is illustrated with a flow chart in FIG. 14. After a decision has been made to engage one or more radio resources in a secondary use at a block 131, a radio transmission is performed, as a secondary use, using the one or more radio resources at a block 133. The transmitted radio signal is here provided with the predefined identifier so as to identify the transmitted radio signal as a secondary use to potential receivers.

The identifier can be any suitable signal characteristic that somehow can be detected by a suitable radio receiver, preferably without having to first perform decoding. The identifier enables identification of an origin of the radio signal. That is, whether it originates from a primary user or a secondary user. A receiver does therefore not have to treat primary and secondary users in the same way, and it becomes possible to give all secondary users a more equal status. Preferably, the identifier is provided at a beginning of a radio signal. It is then possible for a receiver to detect early whether the signal constitutes a primary or a secondary use. For example, if no identifier is found at the beginning of the radio signal, it can immediately be concluded that the radio signal relates to a primary use, and a secondary user/user equipment can decide not to processes the radio signal any further, e.g. unnecessary decoding of the received signal can be avoided.

Figure 2:
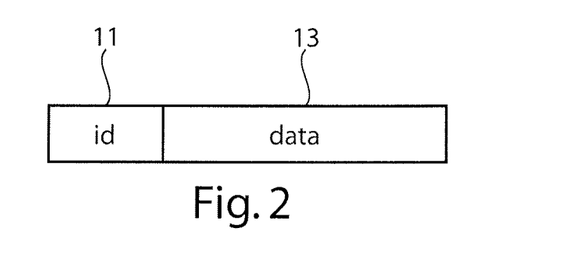
FIG. 2 is a signal format diagram illustrating a radio signal format according to an embodiment of the invention.

FIG. 2 is a signal format diagram illustrating one implementation embodiment of a radio signal provided with an identifier for indicating secondary use. The signal in FIG. 2 includes a predefined signal sequence 11 as the identifier. The signal sequence 11 is thus a signal sequence which has been made generally known as an identifier of secondary use, e.g. by standardisation or otherwise. The signal sequence 11 is followed by a data sequence 13, which may contain any form of data, such as user data, signalling data, operational data, or any combination of different forms of data.

Figure 3A:
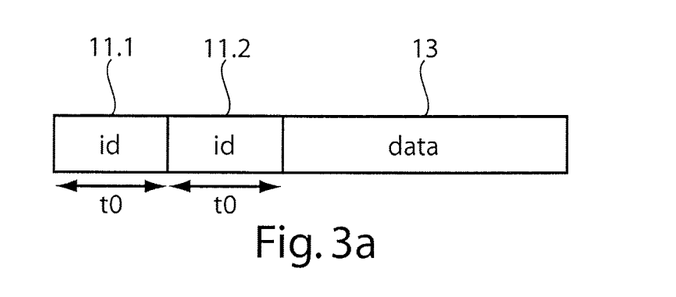
FIG. 3a is a signal format diagram illustrating a radio signal format according to an embodiment of the invention.
Figure 3B:
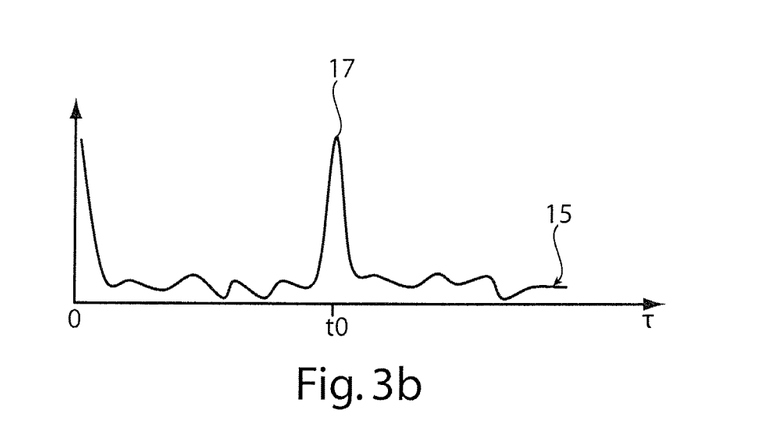

FIG. 3a is a signal format diagram illustrating another implementation embodiment of a radio signal provided with an identifier for indicating secondary use. Here, the radio signal includes a signal sequence 11.1, which does not have to be a known or predefined signal sequence, but which has a predetermined length (duration) t0. The signal sequence 11.1 is repeated at least once. In the particular example of FIG. 3a, the signal sequence 11.1 is repeated exactly once, and the signal sequence 11.1 is thus followed by another signal sequence 11.2 which is copy of the signal sequence 11.1. The radio signal also includes the data sequence 13. It is worth noting that here it is the presence of an at least once repeated signal sequence 11.1 of a particular predetermined duration t0 that constitutes the identifier. The presence of this type of identifier can advantageously be detected by a sliding window autocorrelation operation. This is illustrated in FIG. 3a, which is (a graph of) an autocorrelation function 15 of a received radio signal of the type shown in FIG. 3a. Due to the repetition of the signal sequence 11.1, a peak 17 appears in the autocorrelation function 15 at t0. Consequently, when detecting this type of identifier, an autocorrelation of a received radio signal is performed together with a search for peaks in the autocorrelation function. If a peak is found at a value t0, corresponding to the predetermined duration of the signal sequence 11.1, it is concluded that the radio signal includes the identifier and thus constitutes as secondary use.

Figure 4:
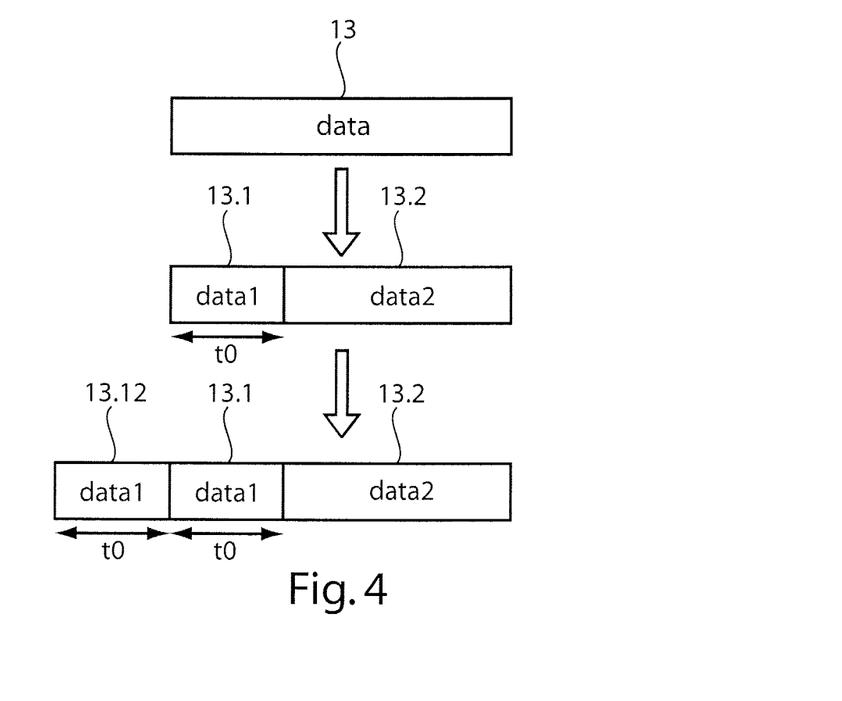
FIG. 4 is a signal format diagram illustrating generation of a radio signal format according to an embodiment of the invention.

The fact that the at least once repeated signal sequence 11.1 does not have to be known as such at a receiver side can be advantageously exploited, as is illustrated in FIG. 4. Here, a radio signal including a data sequence 13 is to be transmitted. First, the data sequence 13 is partitioned into a first data sequence 13.1 and second data sequence 13.2, such that a length (duration) of the first data sequence 13.1 is the predetermined duration t0. Second, at least one copy 13.12 of the first data sequence 13.1 is then introduced in the radio signal to provide repetition, similar to the embodiment of FIG. 2. This minimizes an overhead required to accommodate the identifier. Admittedly, the radio signal is nevertheless longer than the original data sequence 13, but on the other hand an additional amount of repetition encoding is provided for some part of the data, i.e. the data included in the first data sequence 13.1.

Figure 5:
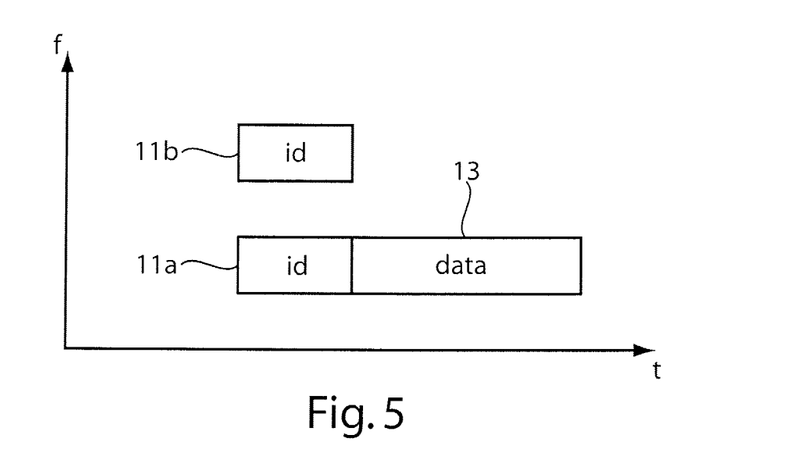
FIG. 5 is a signal format diagram illustrating a radio signal format according to an embodiment of the invention.

FIG. 5 is a signal format diagram illustrating yet another implementation embodiment of a radio signal provided with a secondary use identifier. The radio signal comprises again the data sequence 13. The radio signal further comprises a signal sequence 11a which is repeated at least once. In the particular example of FIG. 5, the signal sequence 11a is repeated exactly once. However, the embodiment of FIG. 5 differs from the embodiment of FIG. 3a in that the signal sequence 11a is repeated on different frequency. Consequently, a copy 11b of the signal sequence 11a is also transmitted, but using a frequency carrier which is different from the one used to transmit the signal sequence 11a. In a particular embodiment, this allows the signal sequences 11a and 11b to be transmitted simultaneously. As with the embodiment of FIG. 3a, it suffices that the at least once repeated signal sequence 11a has the predefined duration (t0) for it to serve as an identifier of secondary use. The embodiment of FIG. 5 may also be combined with the embodiment of FIG. 4, in which case the radio signal which includes the secondary use identifier does not have to be longer than the data sequence 13, because the at least once repeated sequence is a part of the data intended for the receiver.

Figure 6:
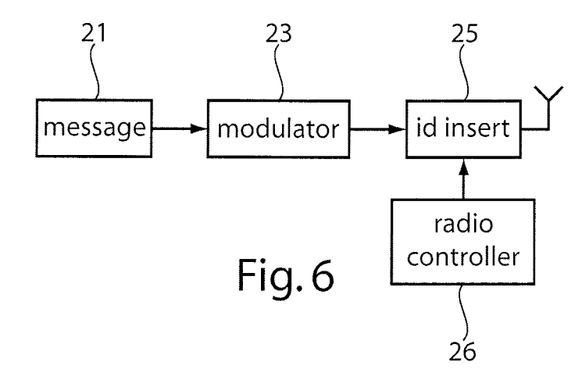
FIG. 6 is a block diagram illustrating a transmitter according to an embodiment of the invention.

FIG. 6 is a block diagram of a transmitter according to one embodiment of the invention. The transmitter may, for example, be part of a secondary user equipment. The transmitter comprises a message generator 21, which produces a data sequence that is to be transmitted. The data sequence may be encoded using some form of channel encoding, as is well understood by a person skilled in the art. The transmitter further comprises a modulator 23, which is connected to the message generator 21. The modulator 23 receives and modulates the data sequence from the message generator 21. The transmitter further comprises an identifier inserter 23 capable of inserting a secondary use identifier in a radio signal comprising the modulated data sequence. Any suitable type of secondary use identifier may be inserted, in particular any one of the types described and indicated above. The identifier inserter 25 can, for example, be adapted to insert the secondary use identifier at a radio frequency level or at base band level. In this particular embodiment, the identifier inserter 25 is also controlled by a radio control unit 26, which determines for which signals the secondary use identifier should be inserted, since it may be that not all radio transmissions from the transmitter relate to a secondary use of radio resources.

Figure 7:
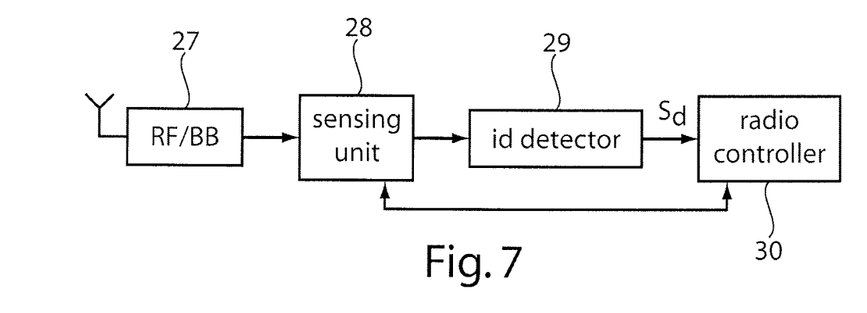
FIG. 7 is a block diagram illustrating a receiver according to an embodiment of the invention.

FIG. 7 is a block diagram illustrating a receiver according to an embodiment of the invention. The receiver includes radio frequency and baseband stages, collectively referred to with reference numeral 27. The stages 27 are capable of receiving a radio signal via a receiving antenna. The receiver further includes a sensing unit 28, here connected to the baseband unit 27. In the sensing unit 28, sensing is performed on any received signal to determine whether a radio transmission is taking place using any considered radio resources. If the sensing unit 28 determines that a transmission is indeed taking place, then the received signal is forwarded to an identifier detector 29 connected to the sensing unit 28. If the sensing unit 28 determines that a transmission is not taking place, then this information is forwarded to a radio controller 30. The identifier detector 29 is adapted to detect whether the received signal includes an identifier that identifies the signal as a signal that constitutes a secondary use of radio resources. In this particular embodiment, the identifier detector 29 is adapted for detection at a baseband level. Alternatively, the identifier detector 29 may, for example, be located and adapted to detect the identifier at a radio frequency level. The identifier detector 29 may be adapted to detect any suitable type of secondary use identifier, including the types described and indicated above. In this particular embodiment, the identifier detector 29 is adapted to generate a detector signal $S_d$, which indicates whether or not the identifier has been detected in the received radio signal. The detector signal is received by the radio control unit 30, which may, based on the detector signal, determine how the receiver is to treat the received radio signal. For example, if the received signal relates a primary use (no identifier detected), the radio control unit 30 may be adapted to decide to abort the reception of the radio signal and/or to dispense with decoding of the radio signal.

Figure 8:
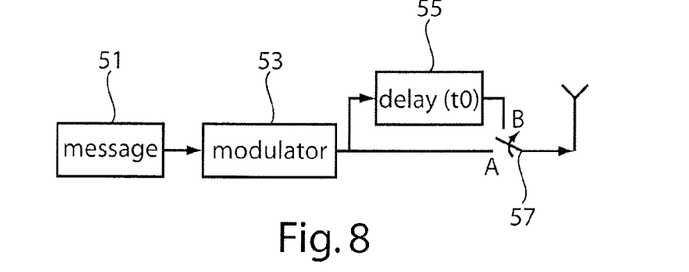
FIG. 8 is a block diagram illustrating a transmitter according to an embodiment of the invention.

FIG. 8 is a block diagram illustrating another transmitter embodiment according to the invention. The transmitter is here specifically designed to insert a secondary use identifier of the type illustrated in FIG. 4. The transmitter comprises a message generator 51, which produces a data sequence that is to be transmitted. The transmitter further comprises a modulator 53, which is connected to the message generator 51. The modulator 53 is adapted to receive and modulate the data sequence generated by the message generator 51. The transmitter further comprises an identifier inserter, here implemented using a delay element 55 and a controllable switch 57. The switch 57 may, for example, be controlled by a radio control unit (not shown). An output from the modulator 53, i.e. the modulated data sequence, is fed to the delay element 55, which delays the received modulated data sequence by a time t0. The switch 57 is connected to a transmission antenna and may be set in two positions: A and B. The position A is connected to the modulator, and the position B is connected to the delay element 55. The switch 57 is initially set in the position A, resulting in a connection between modulator 53 and the transmission antenna. The switch 57 maintains this connection for a time t0 and is thereafter set in the position B, resulting in a connection between the delay element 55 and the transmission antenna. The transmission antenna will therefore first receive an initial portion of the modulated data sequence having a length (duration) of t0. The transmission antenna will thereafter receive the complete modulated data sequence. The initial portion of the data sequence will consequently be repeated once, thus providing a secondary use identifier for the radio signal transmitted by the transmission antenna. Another approach for generating the at least once repeated signal sequence is to read it out, as many times as required, from a memory prior sending data.

Figure 9:
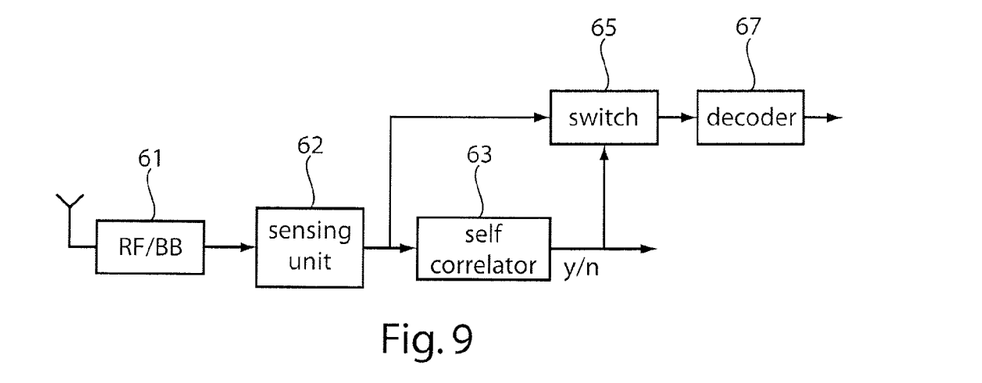
FIG. 9 is a block diagram illustrating a receiver according to an embodiment of the invention.

FIG. 9 is a block diagram illustrating another receiver embodiment according to the invention. The receiver is here specifically designed for detection of secondary use identifiers of the type illustrated in FIGS. 3a and 4. The receiver includes radio frequency and baseband stages 61, where the radio frequency stage is connected to a receiving antenna. The stages 61 are followed by a sensing unit 62, which is configured to operate in a similar manner as the sensing unit 28 of FIG. 7. In the sensing unit 62, sensing is performed on a received radio signal to determine whether a radio transmission is taking place using the considered radio resources. If the sensing unit 62 determines that a transmission is indeed taking place, then the received radio signal is forwarded. If the sensing unit 62 determines that a transmission is not taking place, then no signal is forwarded. A self correlator 63 is connected to the sensing unit 62 and serves as an identifier detector. The self correlator 63 is adapted to calculate an autocorrelation function of a received radio signal, which is forwarded by the sensing unit 62. The self correlator 63 is further adapted to analyse the calculated autocorrelation function in order to detect any significant peaks in the autocorrelation function. If a peak with a position corresponding to the time value t0 is found, the self correlator 63 concludes that the received radio signal includes a secondary use identifier. If no such peak can be found, the self correlator 63 concludes that the received radio signal relates to a primary use. The self correlator 63 is further adapted to generate a detector signal indicating whether or not (y/n) a secondary use identifier has been detected in the received radio signal. In this particular embodiment, the receiver further includes a switch 65, which is connected to the sensing unit 62 and which serves as buffer for temporarily storing the received radio signal, which is forwarded by the sensing unit 62. The switch 65 is connected to the self correlator 63 and adapted to receive the detector signal. If the received radio signal includes a secondary use identifier, the switch 65 is adapted to forward the stored radio signal to a decoder 67. However, if the received radio signal relates to a primary use (no secondary use identifier is detected), the switch 65 is here adapted not to forward the received radio signal to the decoder 67. By not unnecessarily decoding a primary use radio signal, power consumption and processing demand will be lowered. This of course only applies under the assumption that the receiver is currently not interested in radio communications that constitute a primary use.

Figure 10:
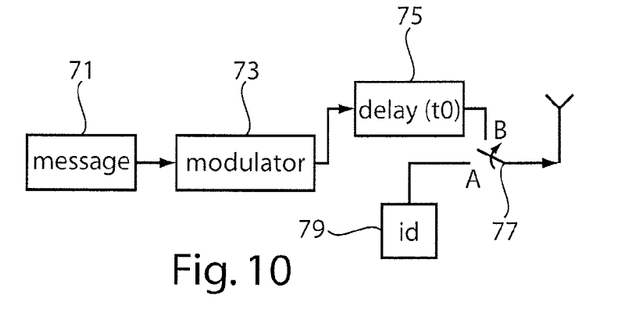
FIG. 10 is block diagram illustrating a transmitter according to an embodiment of the invention.

FIG. 10 is a block diagram illustrating yet another transmitter embodiment according to the invention. The transmitter is here specifically designed to insert a secondary use identifier of the type illustrated in FIG. 2. The transmitter comprises a message generator 71, which produces a data sequence that is to be transmitted. The transmitter further comprises a modulator 73, which is connected to the message generator 71. The modulator 73 is adapted to receive and modulate the data sequence generated by the message generator 71. The transmitter further comprises an identifier inserter, here implemented using a delay element 75, a controllable switch 77 and a signal sequence generator 79. The switch 77 may, for example, be controlled by a radio control unit (not shown). An output from the modulator 73, i.e. the modulated data sequence, is fed to the delay element 75, which is configured to delay the received modulated data sequence by a time t0. The switch 77 is connected to a transmission antenna and may be set in two positions: A and B. The position A is connected to the signal sequence generator 79, and the position B is connected to the delay element 75. The switch 77 is initially set in the position A, resulting in a connection between the signal sequence generator 79 and the transmission antenna. This is done at the same time as the delay element 75 starts to receive the data sequence from the modulator 73. The signal sequence generator 79 now generates a predefined signal sequence, which has a duration t0 and serves as a secondary use identifier. The switch 77 maintains the position A for the time t0 and is thereafter immediately set in the position B, resulting in a connection between the delay element 75 and the transmission antenna. The transmission antenna will therefore first receive the predefined signal sequence and immediately thereafter the data sequence.

Figure 11:
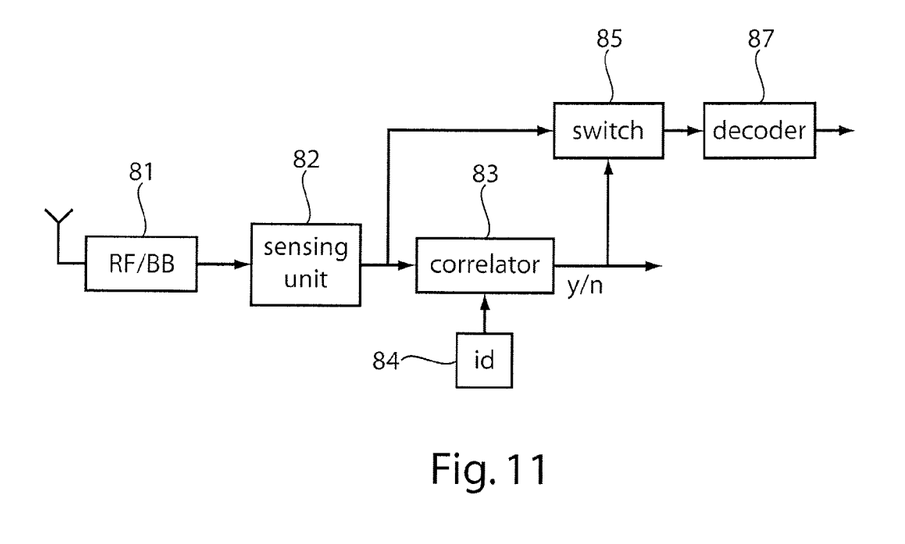
FIG. 11 is a block diagram illustrating a receiver according to an embodiment of the invention.

FIG. 11 is a block diagram illustrating yet another receiver embodiment according to the invention. The receiver is here specifically designed for detection of secondary use identifiers of the type illustrated in FIG. 2. The receiver includes radio frequency and baseband stages 81, where the radio frequency stage is connected to a receiving antenna. The stages 81 are followed by a sensing unit 82, which is configured to operate in a similar manner as the sensing unit 28 of FIG. 7. In the sensing unit 82, sensing is performed on a received radio signal to determine whether a radio transmission is taking place using the considered radio resources. If the sensing unit 82 determines that a transmission is indeed taking place, then the received radio signal is forwarded. If the sensing unit 62 determines that a transmission is not taking place, then no signal is forwarded. A correlator 83, which serves as an identifier detector, is connected to the sensing unit 82. The correlator 83 is also connected to a signal sequence generator 84, which is configured to generate the predefined signal sequence that here serves a secondary use identifier. The correlator 83 receives the predefined signal sequence and is configured to correlate this sequence with any received radio signal, which is forwarded by the sensing unit 82. As is well understood by a person skilled in the art, a correlation operation of this type is an excellent tool for detecting any portion of the received radio signal that is linearly dependent on the predefined signal sequence from the generator 84. That is, any portion of the radio signal that essentially is the same as predefined signal sequence, neglecting any fixed amplitude and/or phase deviance between the two. As is well understood by a person skilled in the art, if suitable normalisation is introduced when performing the correlation calculations, a calculated normalised correlation value can be compared to a fixed threshold value in order determine whether a portion of the received radio signal is the same as the predefined signal sequence. For example, it is possible to introduce a normalisation such that a portion of the received radio signal is the same (in the above-indicated sense) as the predefined signal sequence, if an absolute value of a corresponding normalised correlation value is equal to one (1). However, due to the presence of noise and interference, this will never happen in reality. It is therefore suggested, in this case, to use a threshold value that is smaller than one, but still reasonably close to one. For example, the threshold value may in a particular embodiment be selected in a range from 0.75 to 0.95. The correlator 83 is further adapted to analyse a result of the correlation operation in order to detect any secondary use identifier in the received radio signal. If an absolute value of a calculated normalised correlator value is greater than, or possibly equal to, the above-mentioned threshold value, it is concluded that the predefined signal sequence is included in the received radio signal, which therefore constitutes a secondary use. If no such sequence is found in the received radio signal, it is concluded that the radio signal constitutes a primary use. The correlator 83 is further adapted to generate a detector signal indicating whether or not (y/n) a secondary use identifier has been detected in the received radio signal. In this particular embodiment, the receiver further includes a switch 85, which is connected to the sensing unit 82 and which serves as buffer for temporarily storing the received radio signal, which is forwarded by the sensing unit 82. The switch 85 is connected to the correlator 83 and adapted to receive the detector signal. If the received radio signal includes a secondary use identifier, the switch 85 is adapted to forward the stored radio signal to a decoder 87. However, if the received radio signal relates to a primary use (no secondary use identifier is detected), the switch 85 is here adapted not to forward the received radio signal to the decoder 87. By not unnecessarily decoding a primary use radio signal, power consumption and processing demands will be lowered. This of course only applies under the assumption that the receiver is currently not interested in radio communications that constitute a primary use.

Figure 12:
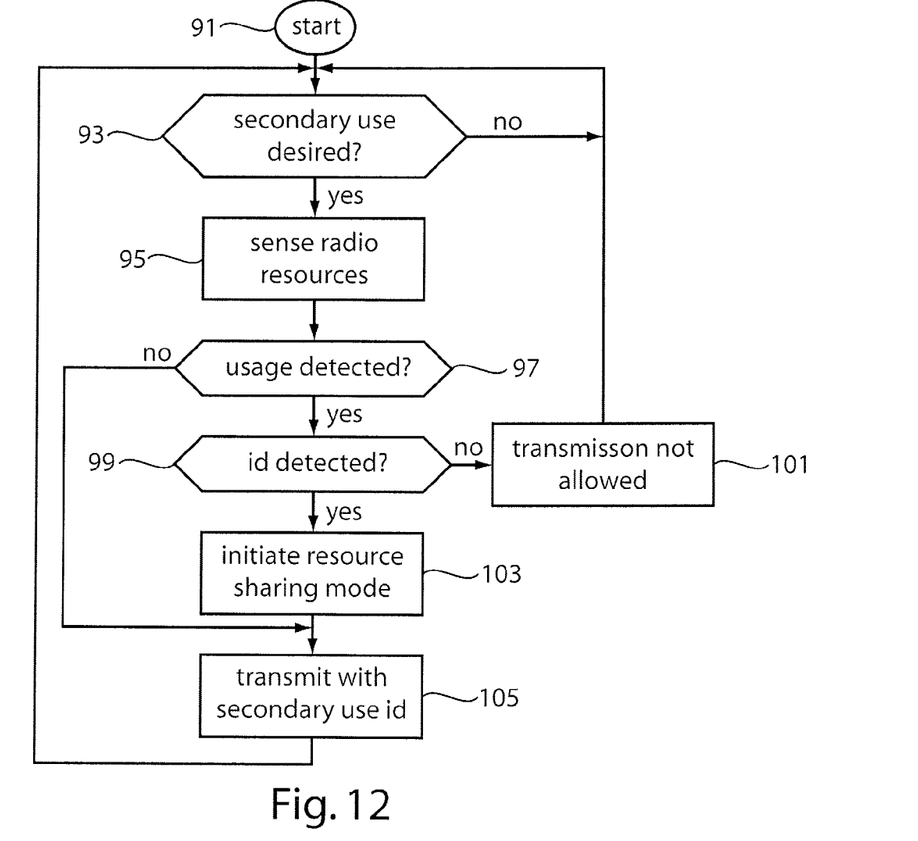
FIG. 12 is flow chart illustrating a method relating to secondary use communications according to an embodiment of the invention.

FIG. 12 is a flow chart illustrating a method of secondary use radio communication according to one embodiment of the invention. The method may, for example, be performed in a secondary user equipment comprising a transceiving unit with a transmitter and a receiver according to any one of the designs described and indicated above. After a start 91, it is determined at a block 93 whether or not it is desired to engage in secondary use communications. For example, more communication capacity may be needed at the present. If so, sensing of one or more radio resources, which have a predefined primary use, and which potentially may be employed for a secondary use, is commenced at a block 95. At a block 97 it is determined whether the sensing at the block 95 has revealed that the sensed radio resources are already in use, i.e. a radio transmission is currently performed with these radio resources. If no radio transmission is detected at the block 97, the method continues at a block 105, where at least one secondary use radio transmission is performed with a secondary use identifier included in the transmission. If, on the other hand, a transmission is detected at the block 97, a secondary use identifier detection is performed at a block 99 in order to find out whether or not the radio transmission includes a secondary use identifier identifying the transmission as a secondary use of the radio resources. If no such identifier is detected, it is concluded at a block 101 that a secondary use transmission with the radio resources cannot be allowed, since the radio resources are already engaged in a primary use, which has to take precedence. The method may thereafter return to the block 93. If, on the other hand, a secondary use identifier is detected at the block 99, a resource sharing mode is initiated at a block 103. In the resource sharing mode, the secondary user equipment performing the method shares the radio resources with one or more other secondary user equipments according to some resource sharing scheme. In effect, this means that the secondary users have some manner of sharing the radio resources available for secondary use. For example, one can envision a simple resource sharing mode within which a secondary user equipment transmitting in a secondary manner over a resource inserts "quiet periods", i.e. times during which it allows other secondary users to utilize the resources. The number of quiet periods for each secondary user can then be adapted based upon how often other secondary users use the quiet periods. This simple type of resource sharing has the advantage that no control signalling is required between different secondary user equipments. More complicated resource sharing schemes, for example, involving control signalling can also be envisioned, e.g. CSMA/CA (Carrier Sense Multiple Access/Collision Avoidance) or ALOHA. Alternatively, a crude form of resource sharing would be to transmit ignoring other secondary users. As part of the resource sharing mode, at least one radio transmission constituting a secondary use of the radio resources and including a secondary use identifier is performed at the block 105. Thereafter, the method may return to the block 93. Consequently, the introduction of the secondary use identifiers and the resource sharing mode facilitate in the above method a more equal sharing of the radio resources between different secondary users.

Figure 13:
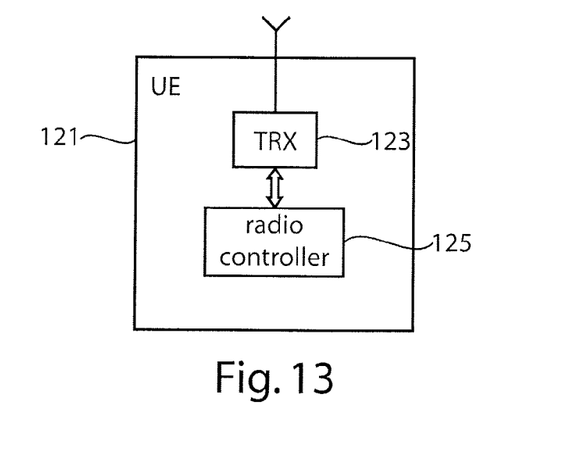
FIG. 13 is block diagram illustrating a secondary user equipment according to an embodiment of the invention.

FIG. 13 is a block diagram illustrating schematically a secondary user equipment 121 according to an embodiment of the invention. The secondary user equipment 121 may, for example, be used to perform the method of FIG. 12. The secondary user equipment 121 comprises a transceiver 123, which is capable of transmitting radio signals provided with secondary use identifiers and which is capable detecting secondary use identifiers in received radio signals. For example, the transceiver 123 may comprise a transmitter and a receiver according any one of the embodiments described and indicated above. The secondary user equipment 121 may of course comprise more than one transceiver 123. The secondary user equipment 121 further comprises a radio control unit 125, which is connected to the transceiver 123 and adapted to control an operation of the transceiver 123. In particular, the control unit 125 may control operations of the transceiver that relate to secondary use of radio resources. The control unit 125 may be implemented with application specific circuitry or programmable circuitry, or by any combination thereof. A person skilled in the art will also appreciate that an operation of the control unit 125 may also fully or partially be implemented by a computer programmed with appropriate software.

According to another embodiment of the invention, it is suggested to use the above-described secondary use identifier to assist in a rendez-vous between secondary users/user equipments, i.e. a process in which secondary users/user equipments find each other prior to engaging in other communication. By using the above-described techniques, a secondary user/user equipment is able to quickly decide whether a signal originates from another secondary user/user equipment, which may be considered for communication, or from a primary user/user equipment, which is not to be communicated with. As a result, rendez-vous attempts which are certain to fail (and which would cause interference with a primary use) can be avoided. The decision can be formed without decoding the signal. The secondary user equipment of FIG. 13 may, for example, be employed in this type of rendez-vouz procedure.

Figure 15:
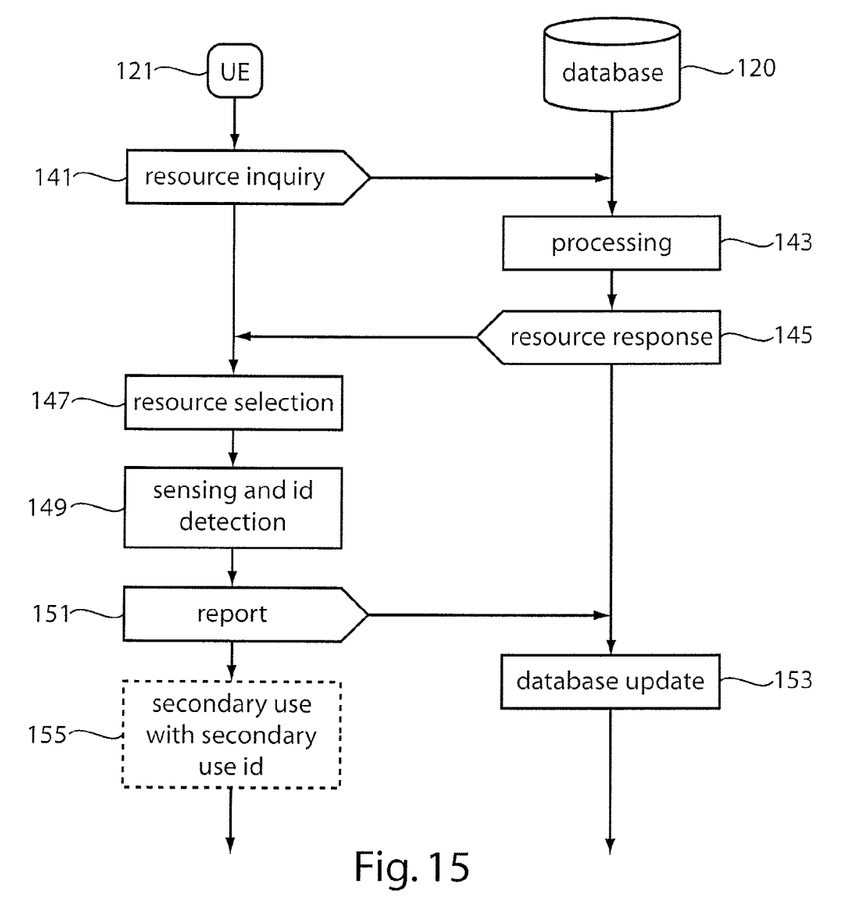
FIG. 15 is flow chart illustrating a method relating to secondary use communications according to an embodiment of the invention.

According to yet another embodiment of the invention, it suggested that secondary user equipments may log radio resource usage patterns in a database. The database may be stored in the secondary user equipment itself. The database may also, or alternatively, be stored centrally, so that several secondary user equipments may share the information. This can aid the secondary user equipment(s) in the process of selecting appropriate radio resource(s) to consider for secondary use. For example, it may be advantageous to consider one or more radio resources for which very little primary use has been registered in the database. An implementation example of this is provided by a flow chart in FIG. 15. At a block 141, a secondary user equipment 121, which is interested in obtaining secondary use opportunities, sends a resource inquiry to a database 120, e.g. via a wireless access point (not shown). The database 120 processes the inquiry at a block 143. The processing performed by the database 120 results in a resource response, which is sent to the secondary user equipment at a block 145. The resource response may, for example, include a list of one or more radio resources which are suitable candidates for secondary use attempts, e.g. because these radio resources are rarely engaged in a primary use. Alternatively, the resource response may include "raw" statistics relating to the use of radio resources for various purposes, thus leaving it to the secondary user equipment 121 to identify suitable candidates for secondary use based on the statistics. At a block 147, the secondary user equipment 121 selects one or more radio resources as candidates for secondary use based on the resource response from the database 120. At a block 149, the secondary user equipment 121 commences sensing combined with detection of secondary use identifier of the selected one or more radio resources. A result of the sensing and detection activities of the block 149 is reported to the database at a block 151. The report may indicate whether or not the selected one or more radio resources are free for secondary use. If the resources are not free, the report may also indicate whether the resources are engaged in primary or secondary use. Based on the report, the database 120 performs a update of the database statistics at a block 153. If the selected one or more radio resources are not engaged in a primary use, the secondary user equipment 121 engages in a secondary use based on these radio resources at a block 155. Any secondary use transmission may then be provided with a secondary use identifier. The secondary use may be performed as part of a resource sharing mode, in case the one or more radio resources are already engaged in a secondary use by at least one other secondary user equipment.

Above, the invention has been illustrated with various embodiments. These embodiments are, however, intended only as non-limiting examples, and the scope of protection is instead defined by the appending claims.

The invention claimed is:

1. A method relating to a secondary use of at least one radio resource having a predefined primary use, the method comprising:
sensing, using a radio receiver, the at least one radio resource to detect whether the at least one radio resource is currently being used for the predefined primary use;
in response to detecting that the at least one radio resource is currently not being used for the predefined primary use, determining whether to engage in the secondary use of the at least one radio resource to transmit secondary use data;
in response to a decision to engage in the secondary use of the at least one radio resource, transmitting by a radio transmitter, using the at least one radio resource, a radio signal including the secondary use data, wherein the transmitting includes
providing the radio signal with a predefined identifier that identifies the radio signal as a secondary use of the at least one radio resource wherein the identifier comprises a signal sequence having a predetermined duration, the predetermined duration identifying the radio signal as a secondary use of the radio resources to a receiver receiving the radio signal.

2. The method according to claim 1, wherein the identifier comprises a signal sequence which is repeated at least once.

3. The method according to claim 2, wherein the radio signal includes data to be transmitted, and wherein the signal sequence being repeated at least once is a portion of the data to be transmitted.

4. The method according to claim 2, wherein the signal sequence is repeated at least once using frequency radio resources that differ from frequency radio resources used for at least one other part of the radio signal.

5. The method according to claim 1, wherein the identifier is provided at a beginning of the radio signal.

6. The method according to claim 1, wherein the sensing comprises
detecting, without decoding the at least one radio resource, whether the at least one radio resource is currently being used for the predefined primary use.

7. A method relating to a secondary use of at least one radio resource having a predefined primary use, the method comprising:

sensing, using a radio receiver, the at least one radio resource to determine whether any radio transmission is currently taking place using the at least one radio resource; and if the sensing determines that a radio transmission is currently taking place, detecting whether a predefined identifier is present in the radio transmission, the identifier identifying the radio transmission as a secondary use of the at least one radio resource to transmit secondary use data in the radio transmission following the identifier wherein the detecting of whether the predefined identifier is present in the radio transmission comprises detecting whether a predetermined signal sequence having a predetermined duration is present in the radio transmission, the predetermined duration identifying the radio signal as a secondary use of the radio resources.

8. The method according to claim 7, wherein the method further comprises:

if the identifier is present, determining whether to engage in a resource sharing mode; and if it is determined to engage in the resource sharing mode, transmitting, as part of the resource sharing mode, a radio signal using the at least one radio resource, the radio signal being provided with the predefined identifier to identify the radio signal as a secondary use of the at least one radio resource.

9. The method according to claim 8, wherein the method further comprises initiating the resource sharing mode.

10. The method according to claim 7, wherein the detecting of whether the predefined identifier is present comprises:

detecting that a signal sequence that is repeated at least once is present in the radio transmission;

comparing a duration of the at least once repeated signal sequence with a predefined value; and determining that the identifier is present if the duration of the at least once repeated signal sequence equals the predefined value.

11. The method according to claim 7, wherein the method further comprises avoiding secondary use of the sensed at least one radio resource for at least some amount of time, in case the predefined identifier is not present.

12. The method according to claim 7, wherein the method further comprises selecting the at least one radio resource based on information obtained from a database containing statistics relating radio resource utilisation.

13. The method according to claim 12, further comprising reporting to the database information relating to a result of the sensing of the at least one radio resource.

14. The method according to claim 7, wherein the detecting whether the at least one radio resource is currently being used for the predefined primary use is performed without decoding the at least one radio resource.

15. A transmitter for a secondary user equipment, the transmitter comprising an identifier inserter configured to, in response to a determination that at least one radio resource is currently not being used for a predefined primary use, insert a predefined identifier into a radio signal transmitted using the at least one radio resource so as to identify the radio signal as a secondary use of the at least one radio resource, wherein the determination is based upon a receiver for the secondary user equipment sensing the at least one radio resource to detect whether the at least one radio resource is currently being used for the predefined primary use wherein the identifier inserter is further configured to include a predetermined signal sequence having a predetermined duration in the predefined identifier.

16. The transmitter according to claim 15, wherein the identifier inserter is further configured to insert the predefined identifier in a form that comprises an at least once repeated signal sequence.

17. The transmitter according to claim 16, wherein the identifier inserter is further configured such that the at least once repeated signal sequence is a portion of the secondary use data.

18. The transmitter according to claim 15, wherein the identifier inserter is further configured to insert the predefined identifier at a beginning of the transmitted radio signal.

19. A receiver for a secondary user equipment, the receiver comprising:

a radio resource sensing device configured to sense at least one radio resource to determine whether a received radio signal is using the at least one radio resource; and an identifier detector configured to, if the sensing detects that the received radio signal uses the at least one radio resource, detect whether a predefined identifier is present in the received radio signal, the predefined identifier identifying the received radio signal as constituting a secondary use of the at least one radio resource wherein the identifier detector is further configured to detect whether a predetermined signal sequence having a predetermined duration is present in the received radio signal.

20. The receiver according claim 19, wherein the identifier detector is further configured to detect a presence of an at least once repeated signal sequence and to compare a duration of the at least once repeated signal sequence with a predefined value.

21. A secondary user equipment comprising at least a first transceiver including a transmitter and receiver, wherein the first transceiver is configured to:

sense, using the receiver, at least one radio resource to detect whether the at least one radio resource is currently being used for a predefined primary use of the at least one radio resource;

in response to a detection by the receiver that the at least one radio resource is currently not being used for the predefined primary use, determining whether to engage in the secondary use of the at least one radio resource to transmit secondary use data; and in response to a decision by the determining to engage in the secondary use of the at least one radio resource, insert, using the transmitter, a predefined identifier into a radio signal transmitted using the at least one radio resource so as to identify the radio signal as a secondary use of the at least one radio resource, and further comprising a radio controller connected to the at least first transceiver and configured to control an operation of the at least first transceiver wherein the predefined identifier comprises a signal sequence having a predetermined duration, the predetermined duration identifying the radio signal as a secondary use of the radio resources to a receiver receiving the radio signal.

* * * * *